Figure 1:
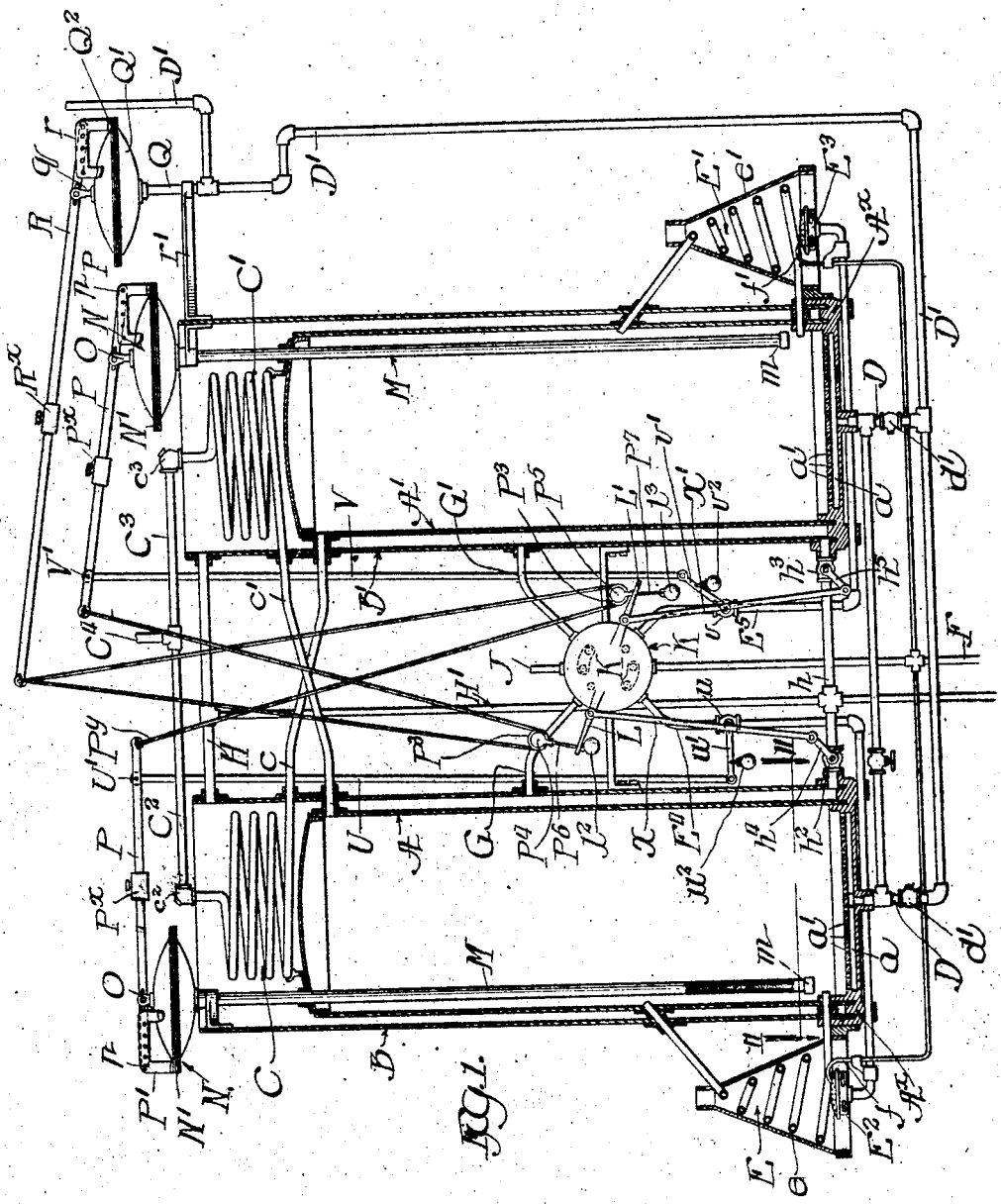

F. W. WOLF, Jr. & H. H. SOUTHWORTH.
REFRIGERATING APPARATUS.
APPLICATION FILED MAR. 1, 1911.

1,046,134.

Patented Dec. 3, 1912.
3 SHEETS—SHEET 1.

Witnesses:

Inventors:
Fred W. Wolf Jr.
Harrison H. Southworth
by Poole & Brown Attys

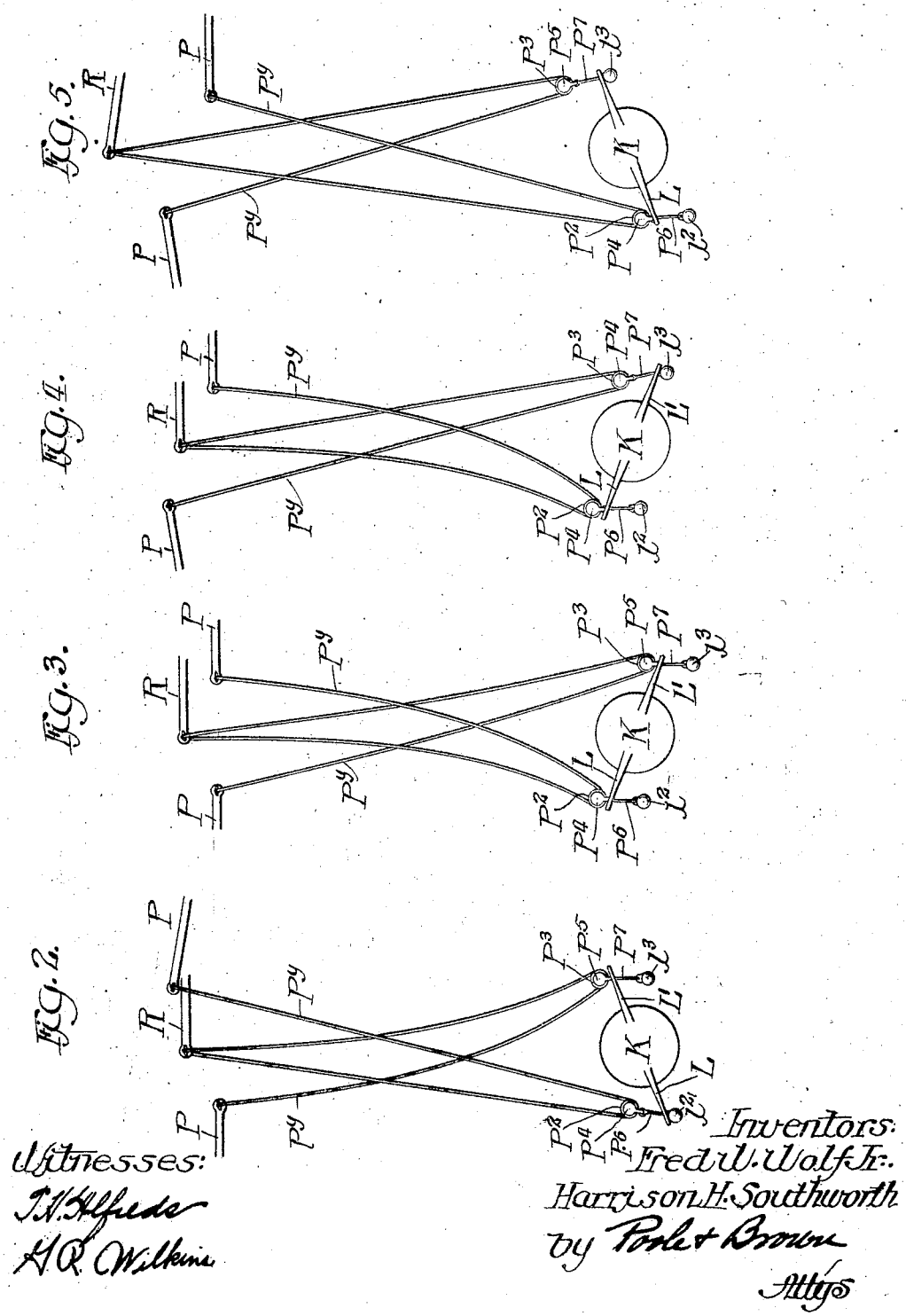

W. WOLF, Jr. & H. H. SOUTHWORTH.
REFRIGERATING APPARATUS.
APPLICATION FILED MAR. 1, 1911.
1,046,134.
Patented Dec. 3, 1912.
3 SHEETS—SHEET 3.
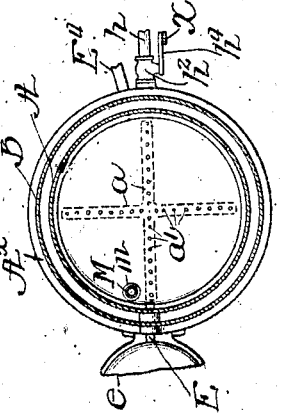
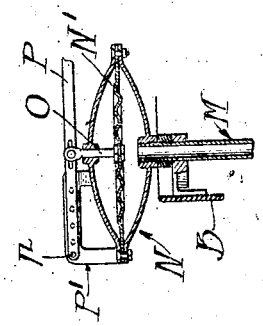
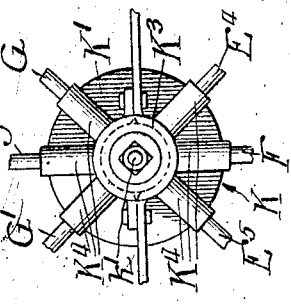
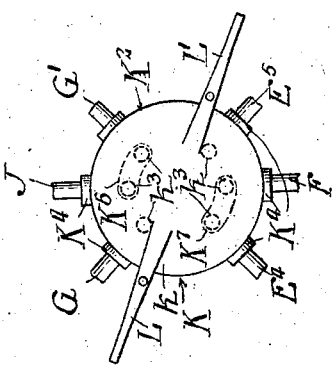
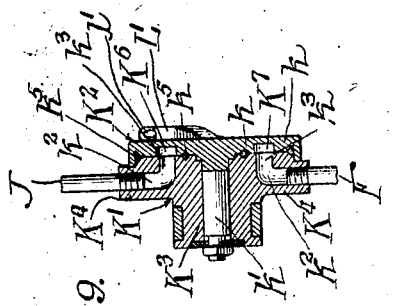
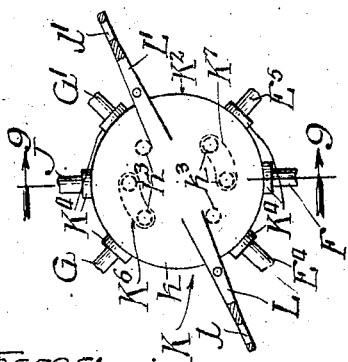
Witnesses:
Inventors:
Fred W. Wolf Jr.
Harrison H. Southworth

UNITED STATES PATENT OFFICE.

FRED W. WOLF, JR., AND HARRISON H. SOUTHWORTH, OF CHICAGO, ILLINOIS, ASSIGNORS TO ICELESS REFRIGERATOR COMPANY, OF CHICAGO, ILLINOIS, A CORPORATION OF ILLINOIS.

REFRIGERATING APPARATUS.

1,046,134.  Specification of Letters Patent.  Patented Dec. 3, 1912.

Application filed March 1, 1911. Serial No. 611,560.

*To all whom it may concern:*

Be it known that we, FRED W. WOLF, Jr., and HARRISON H. SOUTHWORTH, citizens of the United States, and residents of Chicago, in the county of Cook and State of Illinois, have invented certain new and useful Improvements in Refrigerating Apparatus; and we do hereby declare that the following is a full, clear, and exact description thereof, reference being had to the accompanying drawings, and to the letters of reference marked thereon, which form a part of this specification.

This invention relates to an improvement in absorption refrigerating apparatus and consists of the matters hereinafter described and more particularly pointed out in the appended claims.

The invention is shown herein as applied to an absorption system of the alternating type, in which there are included two drums or tanks constituting generator-absorbers containing ammonia liquor, each of which in alternation contains weak liquor and is subjected to cooling means while it receives and absorbs the ammonia gas which has expanded through the refrigerating coils and at the same time the other containing strong liquor is heated to drive off ammonia gas which is then passed through condensing coils and condensed into liquid form and conveyed to a liquid ammonia receiver from which it passes to the refrigerating coils through an expansion valve in a familiar manner. In the operation of such an alternating absorption system it is necessary to alternately cool and heat the said absorption drums or tanks, and the object of the present invention is to provide automatic means for controlling the alternate application of heating and of cooling means to the said drums or tanks.

In the drawings:—Figure 1 is a view representing a vertical section through the absorption drums of a refrigerating apparatus containing the novel features of our invention. Figs. 2, 3, 4 and 5 are detail views in front elevation representing the valve for controlling the heating and cooling means and the members which operate it in successive positions. Figs. 6 and 7 are front elevations of the controlling valve on an enlarged scale showing the movable valve member in its two positions. Fig. 8 is a view representing a vertical section through one of the diaphragm chambers, used in connection with the apparatus. Fig. 9 is a vertical section through the controlling valve on the line 9—9 of Fig. 6. Fig. 10 is a view showing a rear elevation of the controlling valve. Fig. 11 is a transverse section through one of the absorption drums on the line 11—11 of Fig. 1.

In that embodiment of our invention illustrated in the drawings, $A$, $A^1$ indicate two absorption drums located adjacent to each other and adapted to contain ammonia liquor. Said drums may be of any convenient construction for use in a refrigerating apparatus.

$B$ $B^1$ indicate jackets surrounding the said drums $A$ and $A^1$ and adapted for the reception of cooling water. As shown herein, said absorption drums and water jackets have a common bottom member $A^x$.

$C$ $C^1$ indicate dehydrating coils supported, respectively, upon the top of the drums $A$, $A^1$. The coil $C$ is adapted to receive the ammonia gas driven from the drum $A^1$ and is connected therewith by a pipe $c$ and the coil $C^1$ is adapted to receive the ammonia gas from the drum $A$ and is connected therewith by a pipe $c^1$. Said condensing coils are surrounded by the jackets $B$ $B^1$, respectively, which are projected above the tops of the drums $A$ $A^1$ in order to inclose said coils. Said condensing coils are connected by pipes $C^2$ $C^3$ with a discharge pipe $C^4$ leading to the condenser and liquid ammonia receiver (not shown). $c^2$ $c^3$ indicate angle check-valves interposed intermediate the pipes $C^2$ $C^3$ and the associated dehydrating coils $C$ $C^1$, which check-valves are adapted to prevent a reverse flow of ammonia gas through that one of said dehydrating coils leading to the drum which is absorbing.

The bottom member $A^x$ of each of the drums is provided with transverse passages $a$ $a$ (Fig. 11) which opens by a plurality of ports $a^1$ into the interior of the drum. Said passages $a$ $a$ are connected by a threaded nipple with upright pipes $D$ which are connected with a cross-pipe $D^1$, leading from the refrigerating coils and adapted to direct the ammonia gas after it has expanded through said refrigerating coils into one or the other drums $A$ $A^1$. Check-valves $d^1$ are located in each of the pipes $D$ to prevent the escape of the liquor under pressure from the drums to the pipe $D$.

$E$, $E^1$ indicate heating coils which are connected respectively with the drums A A¹. Said heating coils are inclosed by conical hoods $e$ $e^1$ and are adapted to be heated by burners E² E³ which are supplied respectively with gas by pipes E⁴ E⁵. Said burners are started by pilot lights $f$ $f^1$ supplied with gas from a main gas supply pipe F.

G G¹ indicate pipes connected, respectively, with the jackets B B¹ and adapted for the supply of cooling water to said jackets. Near the tops of the jackets and above the level of the condensing coils C C¹, is located a common overflow pipe H which connects with a vertical discharge pipe H¹. The said jackets are also connected with said discharge pipe H¹ at or near the bottom by a pipe $h$. The discharge of water through said pipe $h$ is controlled by valves $h^2$ $h^3$ operated respectively by crank-arms $h^4$ $h^5$ in a manner presently to be described. The cooling water supply pipes G G¹, the gas supply pipes E⁴ E⁵, the main gas pipe F, and a main water pipe J, lead to a common controlling valve K which is of the following construction: Said valve K comprises two members (see Fig. 9), a fixed member K¹ and a rotative member K². The rotative member consists of a flat disk $k$ and an integral shaft $k^1$ which projects from the rear face of said disk. The fixed member K¹ consists of a central hub K³ having an aperture in which the shaft $k^1$ has bearing; and of radial arms K⁴ provided with apertures $k^2$ which open at one end through the outer ends of said arms and near the other ends turn at an angle and open by ports $k^3$ through the front face of said fixed member K¹. The engaging faces of the valve members are provided with annular packing rings $k^5$ located in suitable grooves in said faces to make the joint between said valve members water and gas tight.

As shown in the drawings, (see Figs. 6, 7 and 10) there are six radial arms K⁴, three of which are connected to the water pipes and the other three of which are connected to the gas pipes. The main water supply pipe J is connected to the middle one of the upper three arms while the water supply pipes G G¹, leading respectively to the jackets B B¹, are each connected to an arm at either side of said middle arm. In a like manner the main gas supply pipe F is connected to the middle arm K⁴ on the lower side of the valve, while the gas supply pipes E⁴ E⁵, leading respectively to the burners E² E³, are each connected to an arm at either side of said lower middle arm.

K⁶ K⁷ indicate annular slots formed in the rear face of the rotative valve member K², said slots being of a length to connect two adjacent ports $k^3$, the slot K⁶ forming part of the water connection, while the slot K⁷ forms part of the gas connection. It is apparent from this description that when the movable valve member is rotated into the position indicated in Fig. 6 the main water supply pipe J will be connected by the annular slot K⁶ with the water supply pipe G for directing the cooling water into the jacket B, while the main gas supply pipe F will be connected by the annular slot K⁷ with the gas supply pipe E⁵ so as to direct the supply of gas to the burner E³. When said movable valve member is rotated into the position indicated in Fig. 7 the main water and main gas pipes will be connected, respectively, with the water supply pipe G¹ for directing the water into the jacket B¹ and with the gas supply pipe E⁴ for directing the supply of gas to the burner E².

The rotative valve member K² is provided with radially extending diametrically opposite crank-arms L L¹ which are automatically operated by the following construction: In each of the absorption drums A A¹ is located a pipe closed at the bottom and projecting through the top of the drum and there connected with a diaphragm chamber containing a flexible elastic diaphragm which is adapted to be actuated, under the variations of temperature in said drums, by the expansion of a fluid contained in said pipe and which is arranged to operate a lever operatively connected with one of the crank-arms L L¹. The construction in each case is the same so that a description of one will suffice for both.

M indicates a pipe located within the drum A and having its lower end $m$ closed and its upper end projecting through the top of the tank and there connected with the interior of a diaphragm chamber N, (see Figs. 1 and 8).

N¹ indicates a diaphragm forming one wall of said diaphragm chamber and connected by a rod O with a lever P which is pivotally connected at one end at $p$ to a yoke P¹ supported on the diaphragm chamber. The pipe M contains a fluid adapted to expand under the heat developed in the absorption drum and by its expanding pressure to actuate the diaphragm and raise the lever P. To the pipe D¹ leading from the refrigerating coils is connected a branch pipe Q which opens into a third diaphragm chamber Q¹ similar to the others and having a diaphragm member Q² which is connected by a short rod $q$ to a third lever R pivotally connected at one end to a yoke $r$ supported on said diaphragm chamber. The chamber itself is rigidly connected by a bracket arm $r^1$ with the jacket B¹ of the drum A¹. The three levers P, P and R have their free ends extended into a position above the controlling valve K and are each provided with sliding counterweights Pˣ, Pˣ, Rˣ adapted to be fixed in any position on said levers by means of suitable set-screws. By means of said counterweights the pressure required to operate the respective levers may be accurately predetermined.

Each lever P is connected by a flexible member in the form of a rope or light chain P⁷ with lever R, said flexible members having fixed connection at their ends with the respective levers and being looped about pulleys P² P³, respectively. Said pulleys are mounted in blocks P⁴ P⁵ to which are connected short links P⁶ P⁷ which extend loosely through apertures or openings l l¹ in the arms L L¹. At the ends of said links P⁶ P⁷ are secured weights l² l³ which are larger than the apertures or openings l l¹ and act as stops to engage against the arms L L¹ when, by the action of said levers P, P, R now to be described, one or the other of said pulley blocks P⁴ P⁵ are raised. Starting with the apparatus at the stage in its cycle of operation in which the valve K is in the position indicated in Fig. 7 when the cooling water is directed into the jacket B¹ while the fuel gas is directed into the burner E², and when the temperature in the drum A¹ containing weak liquor, by reason of the action of the cooling water has fallen, while the temperature of the drum A, containing strong liquor, has just began to rise by reason of the application of heat, the diaphragms N¹ N¹ are unaffected by the fluids contained in the pipes M and the diaphragm Q² is unaffected by the pressure of the ammonia gas in the pipe D¹, since the liquor in the drum A¹ is rapidly absorbing the ammonia gas directed to it from the refrigerating coils D¹, and there is little or no back pressure in said pipe. The levers P, P and R are then in the positions indicated in Fig. 3. As soon as the temperature of the drum A rises to a point sufficient to drive off the required amount of ammonia gas and thus reduce the liquor in the drum to a certain stage or degree of weakness, which temperature is carefully predetermined, the expansion of the fluid in the pipe M contained in said tank, expands the associated diaphragm N¹ and lifts the associated lever P. This brings the levers and flexible members into the position shown in Fig. 4 with the weight l² connected to the pulley block P⁵ raised into engaging position with the arm L¹ of the valve K. In the meantime the liquor in the drum A¹ which has been absorbing is approaching the point of the required saturation, and as it approaches said point, the back pressure in the pipe D¹ rises and finally when said point of saturation is reached increases to the predetermined pressure corresponding therewith which pressure is adapted to expand the diaphragm Q² and raise the lever R. This movement of the lever R raises the pulley block P⁵ from the position shown in Fig. 4 to the position shown in Fig. 5, the weight l², which was already in engagement with the crank-arm L, rising with said pulley block and rotating with the movable valve member K² into the position shown in Figs. 5 and 6, with the cooling water directed into the jacket B about the drum A and the fuel gas directed to the burner E³ to heat the drum A¹. The pressure against all the diaphragms now falls and the levers assume the horizontal position shown in Fig. 3, with the valve however in a reversed position with the crank-arm L¹ up and the crank-arm L down and with the position of the pulley blocks and weights reversed to correspond. Ammonia gas is now being driven from the liquor in drum A¹ and absorbed by the liquor in the drum A. As soon as the predetermined temperature is attained in the drum A¹, the fluid in the associated pipe M expands and actuates the diaphragm to raise the associated lever P. This brings the valve operating parts into the position shown in Fig. 2. When the back pressure of the ammonia gas in the pipe D¹ attains the predetermined pressure, the lever R is raised, lifting the weight l¹ which by reason of its engagement with the arm L shifts the movable part of the valve into the position indicated in Fig. 1, and directing the cooling water to the jacket B¹ and the fuel gas to the burner E². The operation thus continues automatically.

When the predetermined temperature in the absorption drum which is being heated is attained before the back pressure in the drum which is being cooled, has reached the predetermined point at which it will effect the lifting movement of the lever R, which will usually be the case, the continued heating of the said first-named drum will tend to increase the temperature of said drum above the said predetermined point and thus might cause the liquor in said drum to pass off in the form of steam. To obviate this possibility and to maintain the drum which has been heated substantially at the predetermined temperature until the main controlling valve is shifted, we provide in the case of each drum an auxiliary valve in the gas supply pipe between the main controlling valve and the burner, which auxiliary valve is directly controlled by the thermostatic member of its associated drum, said auxiliary valve being operated to at once close off the gas supply to the burner of the drum which is being heated when said drum has attained the said predetermined temperature and being adapted to again open or partially open between the periods when the drum which is being heated reaches the predetermined temperature, and when the drum which is being cooled develops the predetermined back pressure. This is for the purpose of maintaining the drum which has been heated at the said predetermined temperature in order that sufficient pressure will be retained in the associated diaphragm chamber N to hold the associated lever P in its uppermost position so that when the lever R is raised the movable valve member $K^2$ will be rotated as heretofore described.

$u$ indicates a valve located in the gas supply pipe $E^4$ between the main controlling valve K and the burner $E^2$; $u^1$ is a crank arm adapted for the operation of said valve; $u^2$ is a weight connected to said crank arm and adapted to maintain said valve $u$ normally in open position, and U is a link pivotally connected at one end to the crank arm $u^1$ and at its other end connected by a pivot pin $U^1$ to the lever P of the associated drum A. A like construction is provided in connection with the other drum, $v$ indicating the valve, $v^1$, the crank arm which operates it, $v^2$, the weight adapted to normally maintain the valve in open position, and V, the link having pivotal connection at $v^1$ with the associated lever P. The operation of these valves is as follows: When the drum which is being heated, as for example, the drum $A^1$ reaches the predetermined temperature, the associated lever P actuated by the thermostatic member within said drum rises and produces one part of the two-part movement of the associated weight $l^2$ which acts to rotate the movable member $K^2$ of the controlling valve K in the manner heretofore described. At the same time it lifts the crank arm $v^1$ so as to close off the valve $v$ and shut off the heat to said drum. As long as this predetermined temperature is maintained in the drum $A^1$ the valve will remain closed, but should the temperature of said drum fall, the lever P controlled by the thermostatic member in said drum will descend and this will permit the weight $v^2$ to open or partially open the valve $v$ and the burner $E^3$, which heats said drum, will again be lighted so as to again raise the temperature to the predetermined point. This will continue, the valve $v$ automatically controlling the flame of the burner to maintain the drum at the predetermined temperature until the movable part $K^2$ of the main controlling valve K is shifted, thus shifting the gas supply to the other burner and the cooling water to the drum $A^1$. When the levers P, P, R, return to their normal horizontal position, the valve $v$ will open and will then have no further effect upon the operation of the system until the drum $A^1$ is again heated and reaches its predetermined temperature.

While in the embodiment of our invention illustrated herein we make use of thermostatically actuated means and pressure actuated means for operating the controlling valves which automatically start and stop the heating and cooling means as applied to each generator absorber, apparently our invention is not limited to this method or means for applying the cooling and heating means in alternation to the two generator absorbers. The important feature is that the generator absorber which is being heated shall be heated to a certain predetermined temperature which corresponds with a certain weakness of liquor that the apparatus is designed to work with and that the generator absorber which is being cooled shall continue to be cooled at least until a certain pressure has been reached therein corresponding with and indicating a certain degree of saturation that the apparatus is designed to work with, when the generator absorber which has been absorbing shall begin to be heated and act as a generator, and the generator absorber which has been generating shall begin to be cooled and shall act as an absorber.

By the arrangement thus described an economical operation of the apparatus is secured since the alternate shifting of the cooling and heating means is not brought about until not only the predetermined amount of ammonia gas has been driven from the liquor in one drum but also the predetermined quantity of gas has been absorbed by the liquor in the other drum. No matter which of these conditions is reached first, the main controlling valve will not be shifted to reverse the cycle until both have been attained although, as just explained, the heating of the drum which is generating will be discontinued as soon as the predetermined temperature corresponding to the desired weakness of liquor therein, has been reached. The main controlling valve actuating mechanism depends upon both for its operation.

In order to drain the cooling water from each jacket of the absorption drum when said drum begins to be heated, we provide links X and $X^1$ connecting, respectively, the crank arm $h^4$ of the valve $h^2$, adapted to empty the jacket B with the crank arm L of the valve K and the crank-arm $h^5$ of the valve $h^3$, adapted to empty the jacket $B^1$ with the crank-arm $L^1$. By this construction, when the valve K is shifted to direct the cooling water from one tank to the other, the associated valve $h^2$ or $h^3$ of the jacket surrounding the first-named tank is opened to discharge the cooling water therein.

By locating the coils C, $C^1$, above the drums and within the water jackets in the manner described, the ammonia gas is dehydrated before it is delivered to the condensing coils, the water of condensation being returned through the pipes $c$, $c^1$, respectively, to the associated absorption drums. This is of advantage in that it tends to prevent the escape of the liquor by vaporization from the absorption drums.

In the foregoing description we have referred throughout to ammonia as the refrigerant to be used in our apparatus with water as the absorbent, as types most familiar and common, and such refrigerant and absorbent are preferred, but it will be understood that the apparatus is capable of use with other refrigerants and absorbents and the invention is in no way limited thereto.

While in describing one embodiment of our invention we have illustrated and referred to certain details of mechanical construction and one form of valve and valve operating mechanism, as well as to a particular method of heating and cooling the drums and to other details of construction and arrangement it is to be understood that our invention is in no way limited thereby except as pointed out in the appended claims.

We claim as our invention:—

1. In a refrigerating apparatus of the alternating absorption type including generator-absorbers arranged in pairs, a conduit adapted for leading the expanded ammonia gas to each generator-absorber of a pair, and means for alternately cooling and heating each of said generator-absorbers, a controlling member for applying said cooling and heating means to said generator-absorbers in alternation, said controlling member having a two-part movement, thermostatically actuated means connected with each of said generator-absorbers adapted to produce one part of said two-part movement of said controlling member when the temperature of the liquor in the generator-absorber subjected to heat rises above a predetermined point, and pressure actuated means connected with said conduit adapted to produce the other part of said two-part movement of said controlling member when the back pressure in the drum which is being cooled rises above a predetermined point.

2. In a refrigerating apparatus of the alternating absorption type including generator-absorbers arranged in pairs, a conduit adapted for leading the expanded ammonia gas to each generator-absorber of a pair, and means for alternately cooling and heating each of said generator-absorbers, a thermostatically actuated member connected with each generator-absorber adapted to be operated when the temperature of the liquor in said generator-absorbers rises above a certain point, a pressure actuated member connected with the said expanded ammonia gas conduit adapted to be operated when the back pressure in one of said generator-absorbers rises above said point, and a controlling member depending for its operation on the combined action of one of said thermostatically actuated members and of said pressure actuated member adapted for applying said cooling and heating means to said generator-absorbers in alternation.

3. In a refrigerating apparatus of the alternating absorption type, including generator-absorbers arranged in pairs, a conduit adapted for leading the expanded ammonia gas to each generator-absorber of a pair, means for alternately cooling and heating each of said generator-absorbers, a pipe closed at one end located in each of said generator-absorbers, said pipes containing a fluid adapted to boil at a predetermined temperature, chambers connected with said pipes and movable members located in each of said chambers, an operating member connected with each of said movable members adapted to be actuated when the temperature in one of said generator-absorbers has risen to a predetermined point, a third chamber connected with said conduit, a movable member actuated by the pressure in said conduit, a third operating member adapted to be actuated by said movable member when the pressure in said conduit rises above a predetermined point, and a controlling member depending for its operation on the combined action of one of said first two-named operating members and said third-named operating member, said controlling member being adapted for applying said heating and cooling means to said drums in alternation.

4. In a refrigerating apparatus of the alternating absorption type, including generator-absorbers arranged in pairs, a conduit adapted for leading the expanded ammonia gas to each generator-absorber of a pair, and means for alternately cooling and heating each of said generator-absorbers, a pipe closed at one end located in each of said generator-absorbers, said pipes containing a fluid adapted to boil at a predetermined temperature, chambers connected with said pipes and movable members located in each of said chambers, an operating member connected with each of said movable members adapted to be actuated when the temperature in one of said generator-absorbers has risen to a predetermined point, a third chamber connected with said conduit, a movable member actuated by the pressure in said conduit, a third operating member adapted to be actuated by said movable member when the pressure in said conduit rises above a predetermined point, a controlling member for applying said cooling and heating means to said generator-absorbers in alternation, said controlling member having a two-part movement, means having lost motion connecting one of said first-named operating members and said third named operating member with said controlling member to move it in one direction, and means having lost motion, connecting the other of said first named operating members and said third named operating member to said controlling member to move it in the opposite direction.

5. In a refrigerating apparatus of the alternating absorption type including generator-absorbers arranged in pairs, a conduit adapted for leading the expanded ammonia gas to each generator-absorber of a pair, and means for alternately cooling and heating each of said generator-absorbers, a controlling member for applying said cooling and heating means to said generator-absorbers in alternation, said controlling member having a two-part movement, thermostatically actuated means connected with each of said generator-absorbers adapted to produce one part of said two-part movement of said controlling member when the temperature of the liquor in the generator-absorber subjected to heat rises above a predetermined point, pressure actuated means connected with said conduit adapted to produce the other part of said two-part movement of said controlling member when the back pressure in the generator-absorber which is being cooled rises above a predetermined point, and auxiliary heat controlling devices one for each generator-absorber, operated by the thermostatic member of said generator-absorber.

6. In a refrigerating apparatus of the alternating absorption type including generator-absorbers arranged in pairs, a conduit adapted for leading the expanded ammonia gas to each generator-absorber of a pair, and means for alternately cooling and heating each of said generator-absorbers, a thermostatically actuated member connected with each generator-absorber adapted to be operated when the temperature of the liquor in said generator-absorbers rises above a certain point, a pressure actuated member connected with the said expanded ammonia gas conduit adapted to be operated when the back pressure in one of said generator-absorbers rises above said point, a controlling member depending for its operation on the combined action of one of said thermostatically actuated members and of said pressure actuated member adapted for applying said cooling and heating means to said generator-absorbers in alternation, and auxiliary heat controlling devices, one for each generator-absorber, operated by the thermostatic member of said generator-absorber.

7. In a refrigerating apparatus of the alternating absorption type, including generator-absorbers arranged in pairs, a conduit adapted for leading the expanded ammonia gas to each generator-absorber of a pair, means for alternately cooling and heating each of said generator-absorbers, a pipe closed at one end located in each of said generator-absorbers, said pipes containing a fluid adapted to boil at a predetermined temperature, chambers connected with said pipes and movable members located in each of said chambers, an operating member connected with each of said movable members adapted to be actuated when the temperature in one of said generator-absorbers has risen to a predetermined point, a third chamber connected with said conduit, a movable member actuated by the pressure in said conduit, a third operating member adapted to be actuated by said movable member when the pressure in said conduit rises above a predetermined point, a controlling member depending for its operation on the combined action of one of said first two-named operating members and said third-named operating member, said controlling member being adapted for applying said heating and cooling means to said generator-absorbers in alternation, and auxiliary heat controlling devices, one for each generator-absorber, actuated by the first-named operating member of said generator-absorber.

8. In a refrigerating apparatus of the alternating absorption type, including generator-absorbers arranged in pairs, a conduit adapted for leading the expanded ammonia gas to each generator-absorber of a pair and means for alternately cooling and heating each of said generator-absorbers, a pipe closed at one end located in each of said generator-absorbers, said pipes containing a fluid adapted to boil at a predetermined temperature, chambers connected with said pipes and movable members located in each of said chambers, an operating member connected with each of said movable members adapted to be actuated when the temperature in one of said generator-absorbers has risen to a predetermined point, a third chamber connected with said conduit, a movable member actuated by the pressure in said conduit, a third operating member adapted to be actuated by said movable member when the pressure in said conduit rises above a predetermined point, a controlling member for applying said cooling and heating means to said generator-absorbers in alternation, means having lost motion connecting one of said first-named operating members and said third named operating member with said controlling member to move it in one direction, means having lost motion, connecting the other of said first named operating members and said third named operating member to said controlling member to move it in the opposite direction, and auxiliary heat controlling devices, one for each generator-absorber, actuated by the first named operating member of said generator-absorbers.

9. In a refrigerating apparatus of the alternating absorption type including generator-absorbers arranged in pairs, a conduit adapted for leading the expanded ammonia gas to each generator-absorber of a pair, and means for alternately cooling and heating each of said generator-absorbers, controlling mechanism for applying said cooling and heating means to said generator-absorbers in alternation, said controlling mechanism having a two-part movement, means associated with each of said generator-absorbers adapted to produce one part of said two-part movement of said controlling mechanism when the temperature of the liquor in the generator-absorber subjected to heat rises above a predetermined point and means associated with said conduit adapted to produce the other part of said two-part movement of said controlling member when the back pressure in the drum which is being cooled rises above a predetermined point.

10. In a refrigerating apparatus of the type described, in combination with generator-absorbers arranged in pairs, means for heating said generator-absorbers in alternation, means for simultaneously cooling said generator-absorbers in alternation, controlling mechanism for applying said cooling and heating means to said generator-absorbers in alternation, said controlling mechanism having a two-part movement, means associated with each of said generator-absorbers adapted to produce one part of said two-part movement of said controlling mechanism when the temperature in the generator-absorber subjected to heat rises above a predetermined point, and means associated with each generator-absorber adapted to produce the other part of said two-part movement of said controlling mechanism when the pressure in the drum which is being cooled rises above a predetermined point.

11. In an absorption refrigeration apparatus including a generator-absorber, means for heating said generator absorber and means for cooling said generator-absorber in alternate cycles, means acting to automatically discontinue the heating of said generator-absorber when the absorbent therein has been reduced to a predetermined stage of weakness and means acting to automatically discontinue the cooling of said generator-absorber when the absorbent therein has reached a predetermined degree of saturation.

12. In a refrigerating apparatus of the type described in combination with generator-absorbers arranged in pairs, means for heating said generator absorbers in alternation, means for simultaneously cooling said generator absorbers in alternation, means for discontinuing the heating of each generator absorber when the temperature therein has reached a predetermined point, and means for discontinuing the cooling of the alternate generator-absorber and for starting the heating of the same when the pressure therein has reached a predetermined point.

13. In a refrigerating apparatus of the type described in combination with generator absorbers arranged in pairs, means for heating said generator absorbers in alternation, means for simultaneously cooling said generator-absorbers in alternation, means for automatically discontinuing the heating of each generator absorber when the temperature therein has reached a predetermined point, and means for automatically discontinuing the cooling of the alternate generator-absorber and for starting the heating of the same when the pressure therein has reached a predetermined point.

14. In a refrigerating apparatus of the type described, in combination with generator-absorbers arranged in pairs, means for heating said generator-absorbers in alternation, means for simultaneously cooling said generator-absorbers in alternation, means for automatically discontinuing the heating of each generator-absorber when the absorbent therein has been reduced to a predetermined degree of weakness, and means for automatically discontinuing the cooling of the alternate generator-absorber and for starting the period of heating of the same and of the cooling of the other generator-absorber when the absorbent in the said alternate generator-absorber has reached a predetermined degree of saturation.

15. In a refrigerating apparatus of the type described, in combination with generator-absorbers arranged in pairs, means for heating said generator-absorbers in alternation, means for simultaneously cooling said generator-absorbers in alternation, means for automatically discontinuing the heating of each generator-absorber when the temperature therein has reached a predetermined point and means for automatically discontinuing the cooling of the alternate generator-absorber and for starting the heating thereof and the cooling of the other generator-absorber when the pressure in said alternate generator-absorber has reached or passed a predetermined point.

16. In a refrigerating apparatus of the type described, in combination with a pair of generator-absorbers, means for heating said generator-absorbers in alternation, means for simultaneously cooling said generator-absorbers in alternation, the simultaneous heating of one generator-absorber and cooling of the other generator-absorber constituting a cycle, means for automatically discontinuing the heating of each generator-absorber when the absorbent therein has been reduced to a predetermined low point of absorption, and means for automatically reversing the cycles of operation of said generator-absorbers after the absorbent in the generator-absorber which has been generating has been reduced to the said predetermined low point of absorption and after the absorbent in the generator-absorber which has been absorbing has reached or passed a predetermined degree of saturation.

17. In a refrigerating apparatus of the type described, in combination with a pair of generator-absorbers, means for heating said generator-absorbers in alternation, means for simultaneously cooling said generator-absorbers in alternation, the simultaneous heating of one generator-absorber and cooling of the other generator-absorber constituting a cycle, means for automatically discontinuing the heating of each generator-absorber when a predetermined temperature therein has been reached, and means for automatically reversing the cycles of operation of said generator-absorbers after the said predetermined temperature has been reached in the generator-absorber which has been generating and after a predetermined pressure has been reached or passed in the generator-absorber which is absorbing.

18. In a refrigerating apparatus of the type described, in combination with a pair of generator-absorbers, means for heating said generator-absorbers in alternation, means for simultaneously cooling said generator-absorbers in alternation, the simultaneous heating of one generator-absorber and cooling of the other generator-absorber constituting a cycle, means for automatically discontinuing the heating of each generator-absorber when a predetermined temperature therein has been reached, means for automatically reversing the cycles of operation of said generator-absorbers including an actuating member capable of a two-part movement, and means for automatically producing the full movement of said actuating member adapted to produce part of said movement when the generator-absorber which has been generating has reached the said predetermined temperature and to produce the balance of said movement when the generator-absorber which has been absorbing has reached or passed a predetermined degree of saturation.

19. In a refrigerating apparatus of the type described, the combination with generator-absorbers arranged in pairs, means for heating said generator-absorbers in alternation, and means for simultaneously cooling said generator-absorbers in alternation, of means for reversing the supply of heating agent, said means being conditioned for its operation upon the conjoint conditions of desaturation in the generator-absorber which is being heated and of saturation in the generator-absorber which is being cooled.

20. In a refrigerating apparatus of the type described, the combination with generator-absorbers arranged in pairs, means for heating said generator-absorbers in alternation, and means for simultaneously cooling said generator-absorbers in alternation, of means for reversing the supply of the cooling agent, said means being conditioned for its operation upon the conjoint conditions of desaturation in the generator-absorber which is being heated and of saturation in the generator-absorber which is being cooled.

21. In a refrigerating apparatus of the type described, the combination with generator-absorbers arranged in pairs, means for heating said generator-absorbers in alternation, and means for simultaneously cooling said generator-absorbers in alternation, of means for reversing the supply of the heating agent and of the cooling agent, said means being dependent for its operation upon the conjoint condition of desaturation in the generator-absorber which is being heated and of saturation in the generator-absorber which is being cooled.

In testimony, that, we claim the foregoing as our invention we affix our signatures in the presence of two witnesses, this 8th day of February A. D. 1911.

FRED W. WOLF, Jr.
HARRISON H. SOUTHWORTH.

Witnesses:
T. H. ALFREDS,
GEORGE R. WILKINS.